A. BOGDÁNFFY.
FEEDING ATTACHMENT FOR CROWN CORK MAKING MACHINES.
APPLICATION FILED MAY 4, 1917.
1,273,723.
Patented July 23, 1918.
2 SHEETS—SHEET 1.
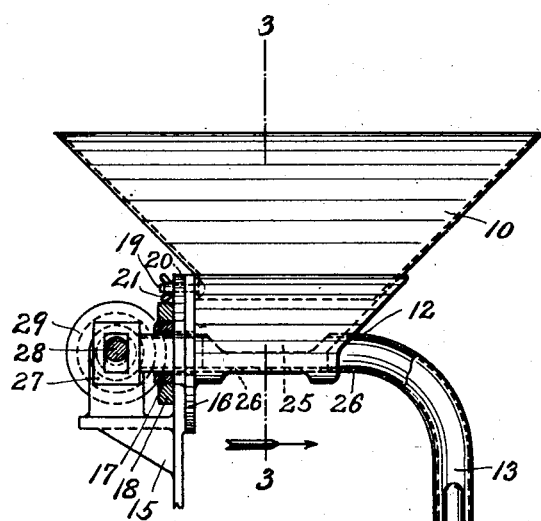
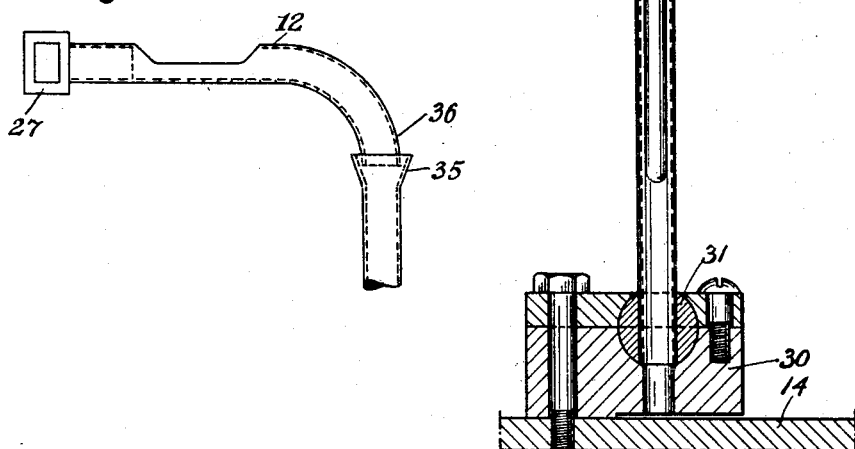
INVENTOR
Alexander Bogdánffy
BY
Fredk Schmidt
ATTORNEY A. BOGDÁNFFY.
FEEDING ATTACHMENT FOR CROWN CORK MAKING MACHINES.
APPLICATION FILED MAY 4, 1917.
1,273,723.
Patented July 23, 1918.
2 SHEETS—SHEET 2.
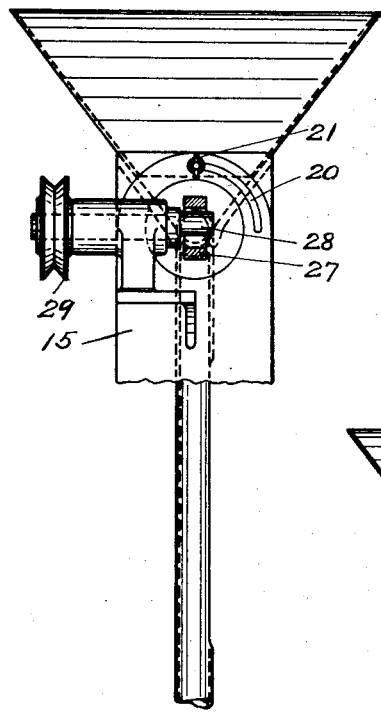
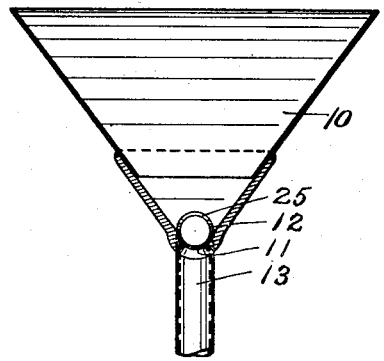
INVENTOR
Alexander Bogdánffy
BY
ATTORNEY

UNITED STATES PATENT OFFICE.

ALEXANDER BOGDÁNFFY, OF BROOKLYN, NEW YORK.

FEEDING ATTACHMENT FOR CROWN-CORK-MAKING MACHINES.

1,273,723.  Specification of Letters Patent.  Patented July 23, 1918.

Application filed May 4, 1917. Serial No. 166,309.

*To all whom it may concern:*

Be it known that I, ALEXANDER BOGDÁNFFY, a former subject of the King of Hungary, (who has declared his intention of becoming a citizen of the United States,) and resident of Brooklyn, in the county of Kings and State of New York, have invented certain new and useful Feeding Attachments for Crown-Cork-Making Machines, of which the following is a specification.

The present invention relates to machines for manufacturing bottle-, jar-, can- and the like closures of the cap variety, including those termed "crown corks".

More particularly the invention pertains to means for feeding the sealing disks of cork or similar material of the closures to the assembling devices of the machine.

In feeding sealing disks of cork or the like to cap assembling machines, many difficulties have been experienced owing to the fact that, first, said disks vary in their thicknesses to some extent, second, they are very light in weight, and, third, they are likely to take a curved or bent shape when being prepared or treated before they are put upon the assembling machine. In the latter machines, a mass of sealing disks is placed into a hopper, wherefrom it has been the practice to feed them usually through a chute into a tube that leads to the transporting means which conveys the sealing disks, one after the other, to the assembling elements of the cap making machines. While it is comparatively easy to cause the disks to pass from the hopper proper into the chute above-mentioned, it has been found almost impossible to pass them from the chute into and stack them properly in the tube leading to the transporting means of the assembling machine. The troubles arise in this last named operation mainly due to the fact that the sealing disks are very light in weight, and the difficulties which are experienced within the hopper proper are ordinarily due to the varying thicknesses and shapes of said disks.

In a prior U. S. Patent No. 1,200,918, I have disclosed a somewhat similar feeding attachment, the same embodying a hopper and a chute communicating with the discharge opening thereof, said chute being adapted to deliver the disks to an oscillating stacking tube; and it is the object of the present invention to dispense with the said chute and with the means for keeping the disks therein continuously in motion. To this end, the invention consists essentially in feeding the disks directly from the hopper to a horizontal portion of the oscillating stacking tube, which portion is provided with a sufficiently large and elongated opening reciprocating through the base of the hopper. In this manner, the construction and operation of the feeding attachment is greatly simplified and its cost materially reduced. The contrivance, furthermore, is more efficient and more rapid in its action than is the case of the apparatus set forth in the aforesaid Letters Patent.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1 is a side elevation, partly in section, of a feeding attachment constructed in accordance with the present invention;

Fig. 2 is a front elevation thereof, partly in section;

Fig. 3 is a vertical section taken on the line 3—3, Fig. 1;

Fig. 4 illustrates a modification.

Similar characters of reference designate corresponding parts throughout the several views.

Referring to the drawings, 10 designates a hopper, generally of conical form, and terminating at its lower reduced end in an elongated opening 11, the same being rounded to receive and provide a bearing for the horizontal portion 12 of a vertically disposed tube 13. The hopper 10 is mounted upon a suitable standard or frame 15, in a plane a substantial distance above the table 14, of the assembling machine (not shown). As one means of attachment, the hopper may have secured thereto or integral there-with a plate or flange 16, having a threaded extension 17 passing through the frame 15, and held thereto, for example, by means of a nut 18. A bolt 19, moreover, extends outwardly from the plate 16 through a slot 20 of the frame, permitting the hopper as a whole to be tilted through an angle of 90° and about the horizontal portion 12 as an axis. In this manner, any remaining cork disks may be readily removed from the said hopper; and, when the latter is in an operative position, it may be secured therein by tightening a winged nut 21 mounted about said bolt 19.

The outlet 11 in the bottom of the hopper 10 is designed to be closed by the horizontal tube portion 12, the upper portion of which, where it coöperates with the bottom of the hopper, being provided with an elongated, horizontal opening 25 of sufficient size to receive the disks contained in the hopper, and in any position which the said disks may assume. Furthermore, the lower wall of the tube portion 12 is provided with a plurality of perforations 26 of size sufficient only to pass cork chips and foreign material to be discharged therethrough as the same is received from the hopper 10 through the opening 25. The horizontal tube portion 12 passes entirely through the base of the hopper 10 as well as through the plate 16, and extension 17, and terminates in a slotted block or the like 27. The latter is adapted to be engaged by a rotatable pin or roller 28 eccentrically disposed with respect to the longitudinal axis of the said horizontal portion 11. A driving pulley 29, actuated by some suitable source of power (not shown), is arranged to rotate the said pin 28 and thereby effect a reciprocation of said horizontal portion 12 of the tube 13. For this purpose, a bearing 30 is mounted upon the table 14 of the assembling machine and is adapted to receive the lower spherical end 31 of the said tube 13, which tube is curved at its upper end and merges into the horizontal portion 12 aforesaid. Or, as illustrated in Fig. 4, the vertical portion of the tube may be maintained stationary and terminate shortly before the horizontal portion in a flared opening 35, into which the curved end 36 of the horizontal portion discharges.

In this manner, the reciprocatory movement communicated to the horizontal portion 12 serves to feed the disks thereto and to the vertical portion 13, and to stack them in the latter in horizontal position, from which they are removed through the lower end by suitable transporting means (not shown) and operating in conjunction with the assembling machine (not shown). It will be noted that the upper wall of the tube portion 12 is freely open to the contents of the hopper, and that there is no intermediate sorting or stacking device or means for keeping the disks in motion between said hopper and the said tube. The construction set forth herein affords an extremely simple and also efficient means for effecting the stacking of the disk members which are merely dumped into the hopper without any particular regard to their position relatively to tube 13.

I claim:

1. In a device of the character described, the combination with a hopper adapted to receive a mass of sealing disks of cork or the like and open along its lower end; of a curved, vertically disposed tube, having a horizontal portion closing the bottom of the hopper and provided with an elongated receiving opening along its upper portion of sufficient size to receive the disks in any position, and means for oscillating said horizontal portion of the tube.

2. In a device of the character described, the combination with a hopper adapted to receive a mass of sealing disks of cork or the like and open along its lower end; of a curved, vertically disposed tube, having a horizontal portion closing the bottom of the hopper and provided with an elongated receiving opening along its upper portion of sufficient size to receive the disks in any position, and means for oscillating said tube about its lower end to reciprocate its horizontal portion in relation to said hopper.

3. In a device of the character described, the combination with a hopper adapted to receive a mass of sealing disks of cork or the like and having a discharge opening; of a vertically disposed tube having its upper end turned into a horizontal position and the lower surface thereof provided with plurality of perforations to discharge chips and other foreign material, and its upper surface cut away to provide an elongated opening of sufficient size to receive a disk in any position, said horizontal portion of the tube passing through the base of the hopper and the said opening of the upper surface thereof registering with the outlet of the hopper; and means to reciprocate said tube within said hopper.

4. In a device of the character described, the combination with a hopper adapted to receive a mass of sealing disks of cork or the like, and the bottom of said hopper being provided with an elongated opening and rounded; of a vertically disposed tube having a horizontal portion adapted to reciprocate in said rounded portion of the hopper and provided at its upper surface with an elongated opening to receive the disks and over its under surface with perforations to discharge chips and other foreign material through the elongated opening in the bottom of the hopper; and means to oscillate said tube.

5. In a device of the character described, the combination with a hopper adapted to receive a mass of sealing disks of cork or the like and open along its lower end; of a curved, vertically disposed tube, having a horizontal portion closing the bottom of the hopper and provided with an elongated receiving opening along its upper portion of sufficient size to receive the disks in any position; a slotted member carried by said tube beyond the hopper; and a rotatable pin eccentrically disposed with respect to the longitudinal axis of said horizontal portion of the tube and engaging the slot of the said slotted member.

6. In a device of the character described, the combination with a frame, and a hopper pivotally attached thereto, said hopper being adapted to receive a mass of sealing disks of cork or the like and having a discharge opening; of a curved, vertically disposed tube, having a horizontal portion about the longitudinal axis of which said hopper is adapted to swing, the said horizontal portion being provided with an elongated receiving opening registering with the said discharge opening of the hopper and of sufficient size to receive the disks in any position; means for oscillating said tube, whereby its horizontal portion reciprocates in relation to the outlet of said hopper; and means to lock said hopper to said frame.

7. In a device of the character described, the combination with a frame, and a hopper pivotally attached thereto, said hopper being adapted to receive a mass of sealing disks of cork or the like and having a discharge opening; of a curved, vertically disposed tube, having a horizontal portion about the longitudinal axis of which said hopper is adapted to swing, and the said horizontal portion being provided with an elongated receiving opening registering with the said discharge opening of the hopper and of sufficient size to receive the disks in any position; means for oscillating said tube, whereby its horizontal portion reciprocates in relation to the outlet of said hopper; a plate attached to the hopper, having a threaded extension passing through the frame and provided with a bolt extending through an arcuate slot of said frame; a nut about said extension to hold the hopper to the frame; and a winged nut on said bolt of the hopper to lock the hopper to the frame.

Signed at New York in the county of New York and State of New York this 2nd day of May, A. D. 1917.

ALEXANDER BOGDÁNFFY.

Copies of this patent may be obtained for five cents each, by addressing the "Commissioner of Patents, Washington, D. C."